United States Patent [19]

Kobayashi

[11] Patent Number: 5,255,037
[45] Date of Patent: Oct. 19, 1993

[54] SHUTTER BLADE OPENING AND CLOSING DEVICE

[75] Inventor: Kouichi Kobayashi, Tokyo, Japan

[73] Assignee: Copal Company Limited, Tokyo, Japan

[21] Appl. No.: 755,557

[22] Filed: Sep. 5, 1991

[30] Foreign Application Priority Data

Sep. 6, 1990 [JP] Japan .................. 2-236146
Jun. 17, 1991 [JP] Japan .................. 3-045384
Jun. 17, 1991 [JP] Japan .................. 3-045385

[51] Int. Cl.⁵ .......................... G03B 9/06; G03B 9/14
[52] U.S. Cl. ............................ 354/229; 354/230; 354/231; 354/256; 354/271.1; 354/274
[58] Field of Search ............ 354/234.1, 236, 246, 354/247, 250, 265, 266, 152, 228–231, 237, 238.1, 256, 271.1, 274

[56] References Cited

U.S. PATENT DOCUMENTS

| | | | |
|---|---|---|---|
| 3,942,183 | 3/1976 | Whiteside | 354/230 X |
| 4,129,367 | 12/1978 | Whiteside | 354/247 X |
| 4,149,794 | 4/1979 | Takahama et al. | 354/237 X |
| 4,527,876 | 7/1985 | Tanaka et al. | 354/247 X |
| 4,624,542 | 11/1986 | Ikeno et al. | 354/152 |
| 4,673,278 | 6/1987 | Fukuda et al. | 354/152 X |
| 4,730,200 | 3/1988 | Kitazawa | 354/152 |
| 4,797,700 | 1/1989 | Tsuji et al. | 354/271.1 |
| 4,843,420 | 6/1989 | Fukuda et al. | 354/152 X |

FOREIGN PATENT DOCUMENTS

| | | | |
|---|---|---|---|
| 58-27134 | 2/1983 | Japan | 354/234.1 |
| 60-249123 | 12/1985 | Japan | |
| 3-33729 | 2/1991 | Japan | 354/234.1 |

Primary Examiner—Michael L. Gellner
Assistant Examiner—J. K. Han
Attorney, Agent, or Firm—Cushman, Darby & Cushman

[57] ABSTRACT

The camera shutter comprises two shutter blades which have first opening forming portions and second opening forming portions capable of alternatively forming two exposure openings different in area on an exposure aperture. These shutter blades are opened and closed by a shutter blade opening and closing lever which can be retained at a neutral position by a closing spring. The shutter blade opening and closing lever is turned by a motor which starts from the neutral position rotates in one of two directions opposite to each other. The lever is equipped with a opening spring capable of exerting a resilient force in the rotating directions of the opening and closing lever. The resilient force of the opening spring is weaker than that of the closing spring. The first opening forming portions form an exposure opening when the motor is started in a first direction and the second opening forming portions form an exposure opening when the motor is started in a second direction. Sizes of the exposure openings are adjustable by turning an adjustable eccentric stopper. This camera shutter can perform accurate and stable exposure operations though it has a simple construction and can be manufactured at a low cost.

18 Claims, 8 Drawing Sheets

SHUTTER BLADE OPENING AND CLOSING DEVICE

BACKGROUND OF THE INVENTION

1. Field of the Invention

The present invention relates to a camera shutter which is capable of forming two types of exposure openings different in size from each other by reversing the starting directions of a plurality of shutter blades when they are to be opened.

2. Description of the Related Art

There have been proposed shutters of the type capable of switching between two exposure openings different in size for use with low cost still cameras. These shutters operate by changing emulsion speed of the film to be used with a single shutter speed which is kept unchanged. For example, the shutter opens to a certain side for one speed film, but opens to a different size for a second speed film. From the viewpoint of construction, these shutters are classified into two types: one type uses two driving sources, one for operating the shutter blades and the other for switching exposure opening diameters respectively. The second type uses as a driving source, a single pulse-motor which is reciprocally rotated in directions reverse to each other for switching exposure openings different in size from one to the other (See Japanese Patent Preliminary Publication No. Sho 60-249123).

The camera shutter of the former constructional type, which is equipped with the two driving sources for performing the shutter functions, has a defect that it requires a large number of parts, a large number of assembly stages, etc., thereby increasing manufacturing cost and decreasing the reliability of the shutter itself. On the other hand, the camera shutter of the latter constructional type requires rotating the pulse motor in both the normal and reverse directions for exposure of film and must use a complicated electrical circuit, thereby increasing manufacturing cost of the electrical system and this increasing manufacturing cost of the shutter itself.

SUMMARY OF THE INVENTION

It is therefore a primary object of the present invention to provide a camera shutter which has a simple construction and can be manufactured at a low cost.

Another object of the present invention is to provide a camera shutter which can accurately perform the opening and closing movement of the shutter blades for precise exposure control.

A further object of the present invention is to provide a camera shutter which facilitates fine adjustment of exposure at the assembly stage and is free from malfunctions.

According to the present invention, these objects attained by a first opening forming portion and a second opening forming portion in each of the plurality of shutter blades. A first exposure opening is generated with the first opening forming portions when a motor is driven for moving the shutter blades in a first direction. A second exposure opening different in area from the first exposure opening with the second opening forming portions when the motor is driven for moving the shutter blades in a second direction opposite to the first direction. Finally the shutter blades are biased and moved by a closing spring for maintaining the shutter blades at closed positions thereof when the shutter blades are to be closed for terminating the exposure.

The camera shutter according to the present invention further comprises an opening spring which has a resilient force weaker than that of the closing spring. The opening spring is so adapted as to exert no resilient force in either the first or the second direction when the shutter blades are at the closed positions thereof. However, the opening spring exerts a resilient force in either of the first or second directions in which each of the shutter blades is moved in by the motor. Due to the construction described above, the camera shutter according to the present invention prevents re-exposure of the film caused by inertia when the shutter blades are to be closed.

The camera shutter according to the present invention further includes a stopper which is adjustable in position thereof. The stopper is brought into contact with at least one of the shutter blades when the first or second exposure opening is to be determined by the shutter blades. This stopper permits accurate adjustment of the area of the exposure opening, thereby making it possible to accurately control exposure without changing the duration of time for supplying current to the driving motor when either of the exposure openings is to be used.

Accordingly, to the present invention, a proper exposure time can be easily controlled in accordance with the brightness of an object to be photographed, and the shutter can be used as a program shutter by selecting any one of the first and second exposure openings and the shutter speed.

These and other objects as well as the features and advantages of the present invention will become apparent from the following detailed description of the preferred embodiments when taken in conjunction with the accompanying drawings.

DESCRIPTION OF THE PREFERRED EMBODIMENTS

Now, a first Embodiment of the camera shutter according to the present invention will be described below with reference to FIG. 1 through FIG. 10.

In these drawings, the reference numeral 1 represents an exposure aperture formed in a shutter base plate P, the reference numeral 2 designates a shutter blade which is pivoted about a pin 3 studded on the shutter base plate P, and has a first opening forming portion 2a, a second opening forming portion 2b and a slot 2c. The reference numeral 4 denotes a second shutter blade which is pivoted about a pin 5 studded on the shutter base plate P, and has a first opening forming portion 4a, a second opening forming portion 4b and a slot 4c. The second shutter blade the reference numeral 6 represents a shutter blade opening and closing lever which is pivoted about a shaft 7 studded on the shutter base plate P, and equipped at a first arm end with a pin 6a inserted commonly into the slots 2c, 4c of the shutter blades 2, 4. The shutter blade opening and closing lever has a second arm end with a fork portion 6b and at a third arm end with a pin 6c.

The shutter blades 2 and 4 have the same shape and overlap with each other in such positional relationship that one is set upside down and the two blades are symmetrical with regard to the exposure aperture 1. In other words, the first opening forming portions 2a, 4a and the second opening forming portions 2b, 4 have shapes so as to form two openings different in size concentrically located with the exposure aperture 1 when the shutter blades 2, 4 attain to the fully opened positions thereof.

The reference numeral 8 represents a driving motor such as a DC motor which is mounted on the shutter base plate P and is equipped at an eccentric location with a magnet rotor having a driving pin 8a fitted into the fork portion 6b of the lever 6. The reference numeral 9 designates a shutter blade closing spring which is wound around the shaft 7 and stretched so that both arms 9a, 9b sandwich the pivot pin 3 for the shutter blade 2 and the pin 6a studded on the lever 6 in the shutter blade closed state illustrated in FIG. 1. This closing spring 9 is so composed as to be capable of retaining the shutter blade opening and closing lever 6 and the driving pin 8a at neutral positions thereof, thereby keeping the shutter blades 2, 4 at the closed positions thereof. When the driving motor 8 is not electrically energized.

The reference numeral 10 denotes a pole studded on the shutter base plate P at such a location that the center of said pole is positioned on a straight line traced from the shaft 7 to the pin 6c on the opening and closing lever 6 when the opening and closing lever is at the neutral position thereof. The reference numeral 11 represents a shutter blade opening spring which is wound around the pin 6c and stretched so that both arms 11a, 11b sandwich the pole 10. This opening spring 11 has a resilient force that is weaker than that of the shutter blade closing spring 9 so that the former exerts no rotating force to the opening and closing lever 6 while the lever 6 is kept at the neutral position thereof.

Figure 4:
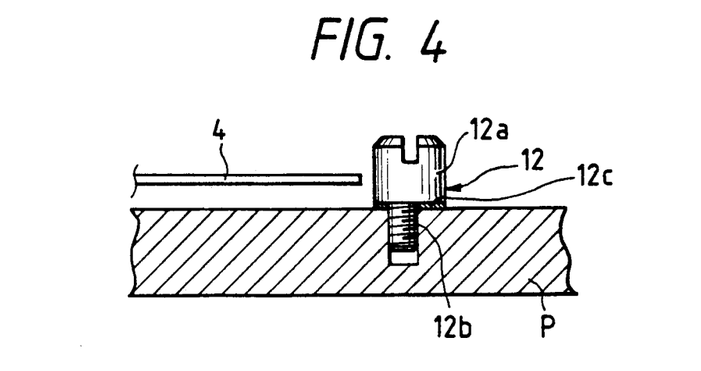
FIG. 4 is a partial sectional view illustrating a structure for attaching a stopper to the shutter base plate.

The reference numeral 12 designates a stopper planted on the shutter base plate P in such a manner that the stopper is rotatable eccentrically and engages with the second end of the shutter blade 4 at the fully opened positions of the shutter blades 2, 4 when the smaller exposure opening is selected, i.e., when the second opening forming portions 2b, 4b form the opening. More specifically, the stopper 12 has, as illustrated in FIG. 4, a cylindrical head 12a to be engaged with the end of the shutter blade 4 and a threaded shaft 12b which protrudes at a location eccentric from said head 12a and is screwed into the shutter base plate P. A spring washer 12c, for example, should preferably be interposed between the head 12a and the shutter base plate for preventing the stopper 12 from being rotated accidentally when the threaded shaft 12b is screwed into the shutter base plate P.

Figure 5:
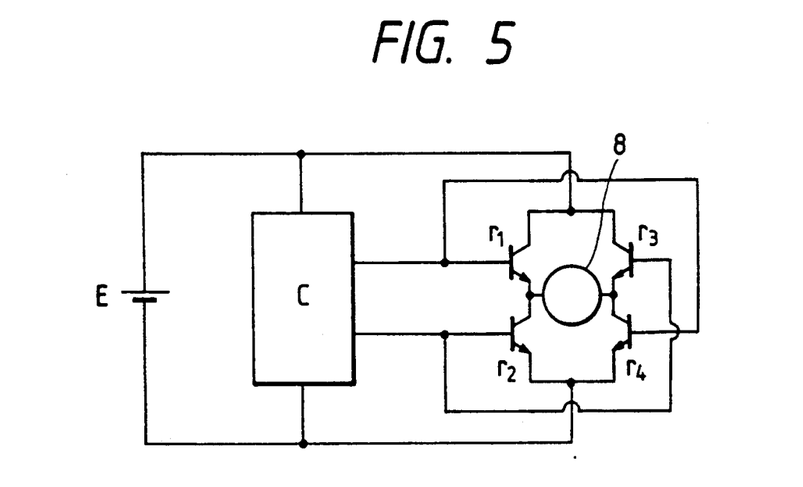
FIG. 5 is a wiring diagram illustrating an example of a motor driving circuit.

FIG. 5 shows an example of a driving circuit for the driving motor 8. In this drawing, the reference symbol E represents a power source, the reference symbols $r_1$, $r_2$, $r_3$ and $r_4$ designate transistors, and the reference symbol C denotes a control circuit which determines the rotating direction and an energizing time of the driving motor 8 so as to perform an exposure adequate for the brightness of an object to be photographed, and sensitivity of a film to be used, etc.

Figure 1:
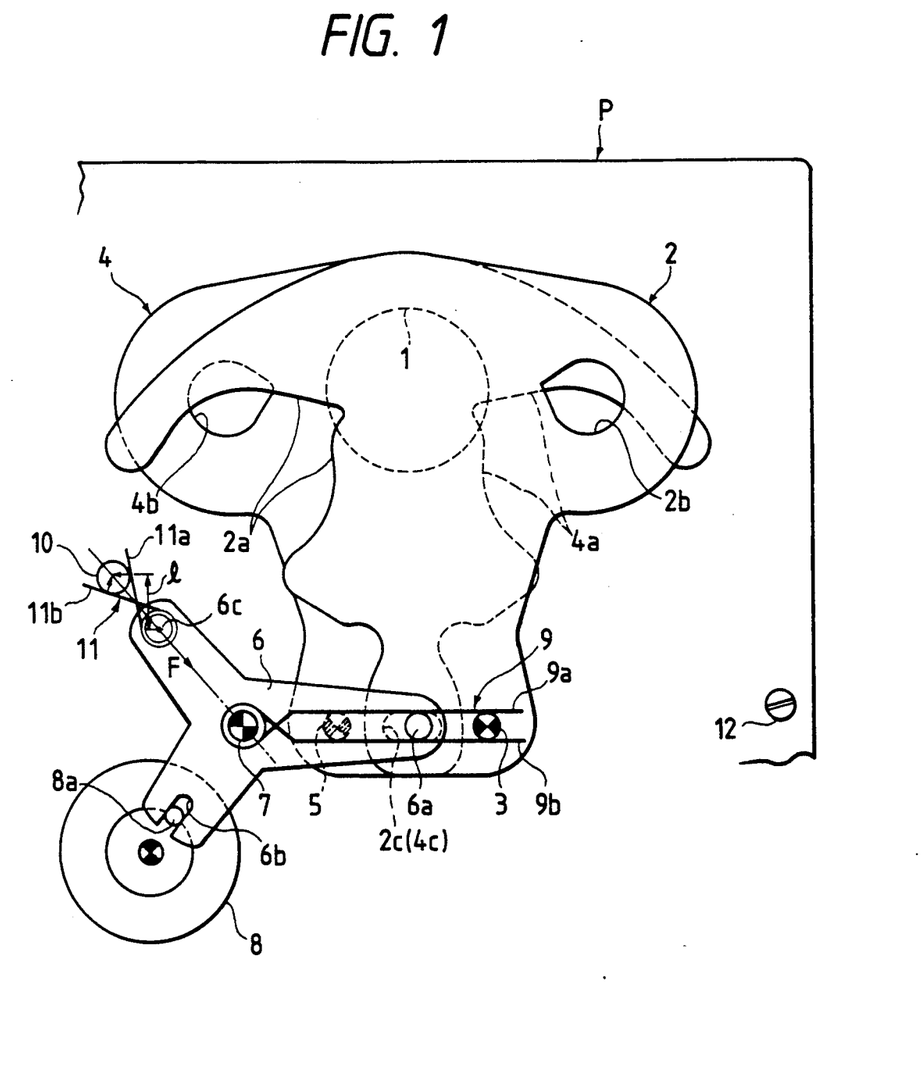
FIG. 1 is a plan view illustrating structures of main parts of Embodiment 1 of the camera shutter according to the present invention in a condition where the shutter blades are closed.
Figure 2:
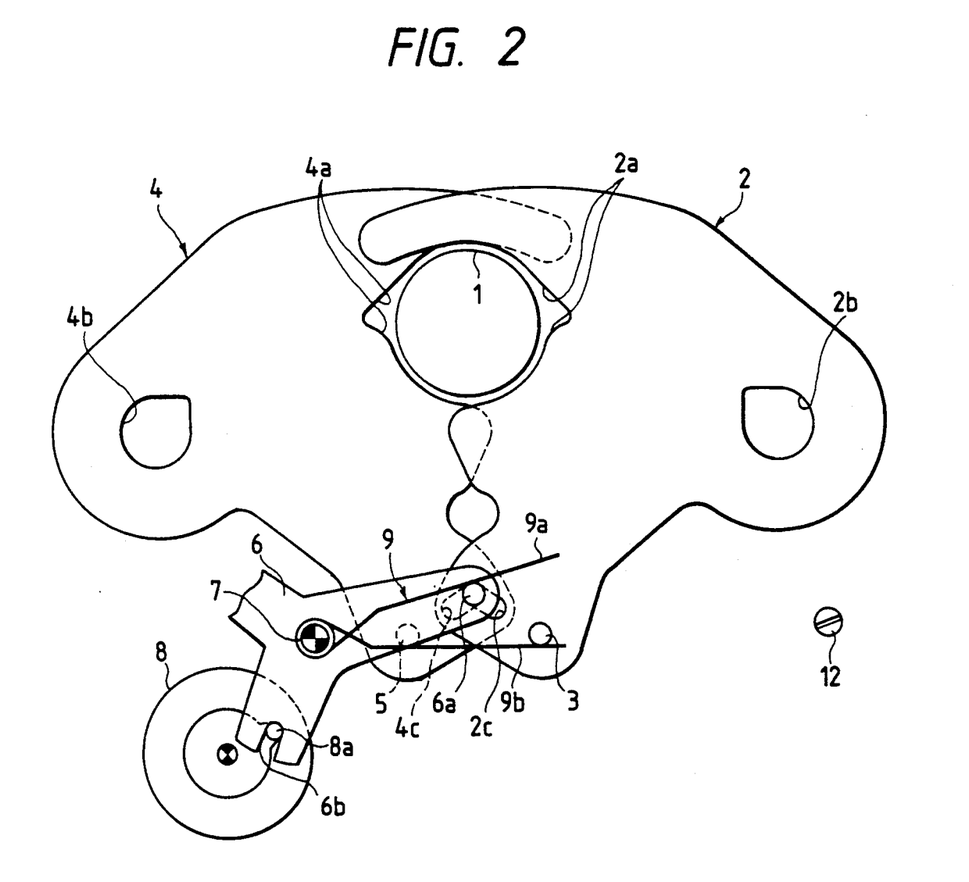
FIG. 2 and FIG. 3 are plan views of the main parts illustrating a fully opened state of the Embodiment 1 wherein the shutter blades are moved and opened in the directions different from each other.

Functions of the First Embodiment are described below:

When a driving current is supplied to the driving motor 8 so as to turn the rotor clockwise at a predetermined angle in the state illustrated in FIG. 1, the driving pin 8a is displaced to the location shown in FIG. 2, whereby the opening and closing lever 6 is turned counterclockwise to the location shown in FIG. 2 against the resilient force exerted by the arm 9a of the shutter blade closing spring 9. This turning of the opening and closing lever 6 causes clockwise rotation of the first shutter blade 2 around the pin 3 and counterclockwise rotation of the second shutter blade 4 around the pin 5 until these shutter blades are brought to the fully opened positions respectively (See FIG. 2). In this case, area of the exposure opening is determined by the exposure aperture 1. Since the current supplied to the driving motor 8 is stopped upon lapse of a proper exposure time, the shutter blade opening and closing lever 6 is rapidly turned clockwise by the returning force of the shutter blade closing spring 9 which is exerted to the pin 6 by way of the arm 9a, at the same time, the shutter blades 2, 4 are returned to the positions shown in FIG. 1, and set at the closed states thereof, thereby terminating one exposure operation.

In contrast, when a driving current of the polarity reverse to that of the driving current described above is supplied to the motor 8 by changing the emulsion speed of film to be used, for example, the driving pin 8a is rotated counterclockwise at a predetermined angle in the state illustrated in FIG. 1. The shutter blade opening and closing lever 6 is thus turned clockwise, whereby the first shutter blade 2 is rotated counterclockwise around the pin 3 and the second shutter blade 4 is rotated clockwise around the pin 5 against the resilient force exerted by the arm 9b of the shutter blade closing spring 9 until the shutter blades 2, 4 are brought to the fully opened positions thereof (See FIG. 3). In this case, the exposure opening is smaller than the exposure aperture 1. When the current supply to the driving motor 8 is stopped upon lapse of a proper exposure time, the shutter blade opening and closing lever 6 is rapidly turned counterclockwise by the returning force of the shutter blade closing spring 9 which is exerted to the pin 6a by way of the arm 9b. And at the same time, the shutter blades 2, 4 are returned to the positions shown in FIG. 1 and set in the closed states thereof, thereby terminating one exposure operation which is different from that already described above.

Figure 3:
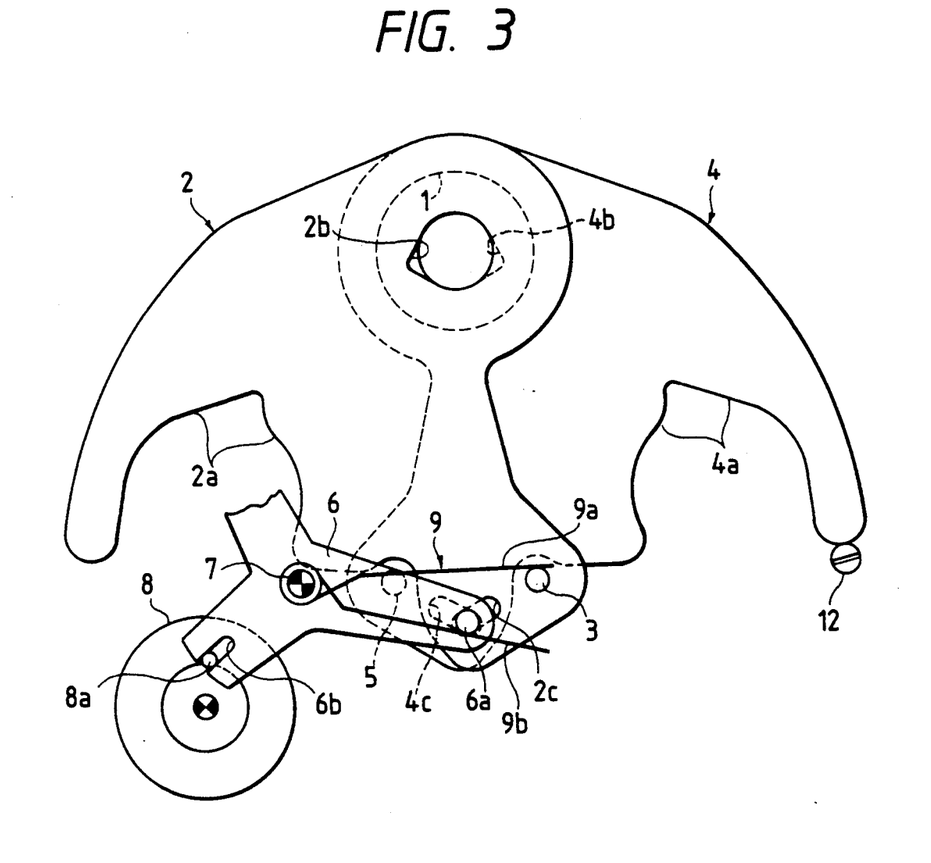
Figure 6A:
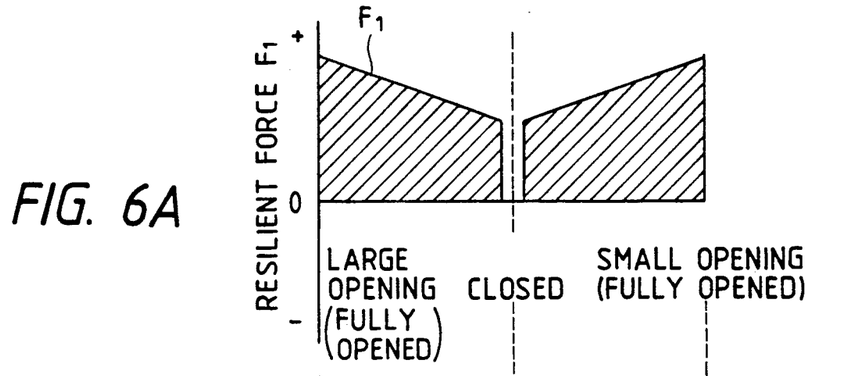
FIG. 6A is a diagram illustrating variations of the resilient force of the shutter blade closing spring during the shutter blade opening and closing movement.
Figure 6B:
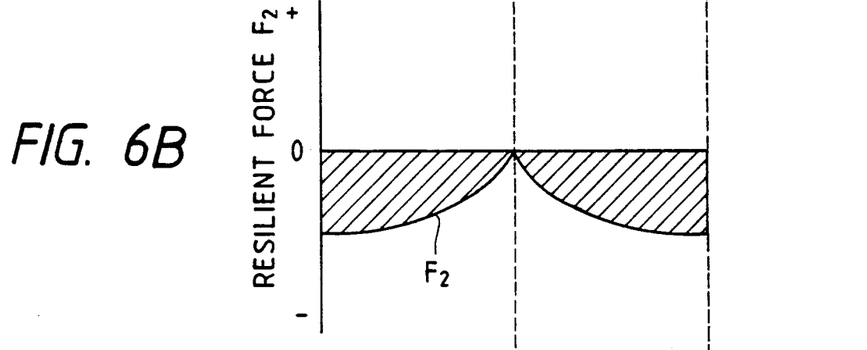
FIG. 6B is a diagram illustrating variations of the resilient force of the shutter blade opening spring during the shutter blade opening and closing movement.
Figure 6C:
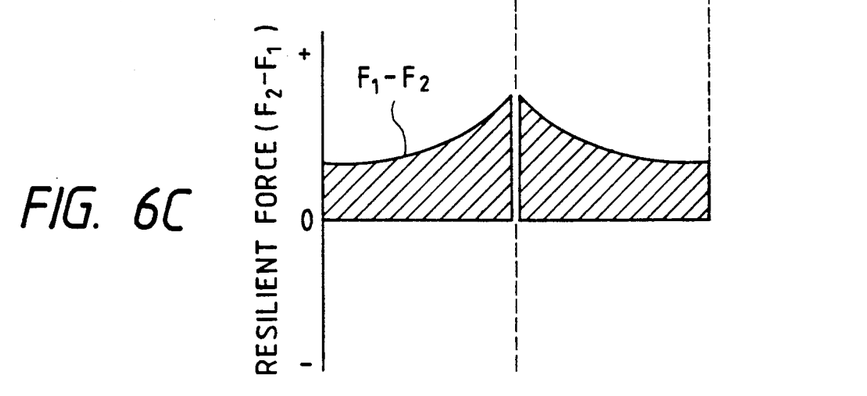
FIG. 6C is a diagram illustrating variations of a total sum of the resilient force of the shutter blade closing spring and that of the shutter blade opening spring during the shutter blade opening and closing movement.
Figure 7:
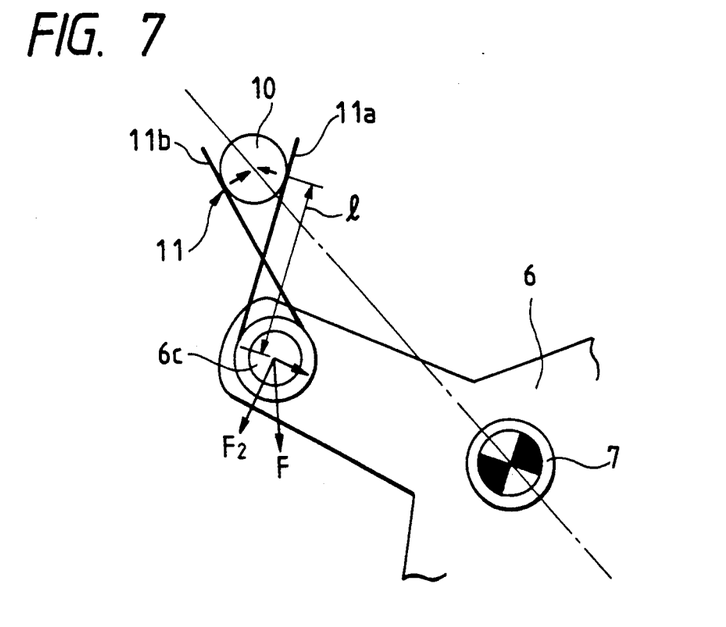
FIG. 7 is a plan view illustrating relationship between rotation of a shutter blade opening and closing lever and acting direction of the resilient force of the shutter blade opening spring when the larger exposure opening is selected.
Figure 8:
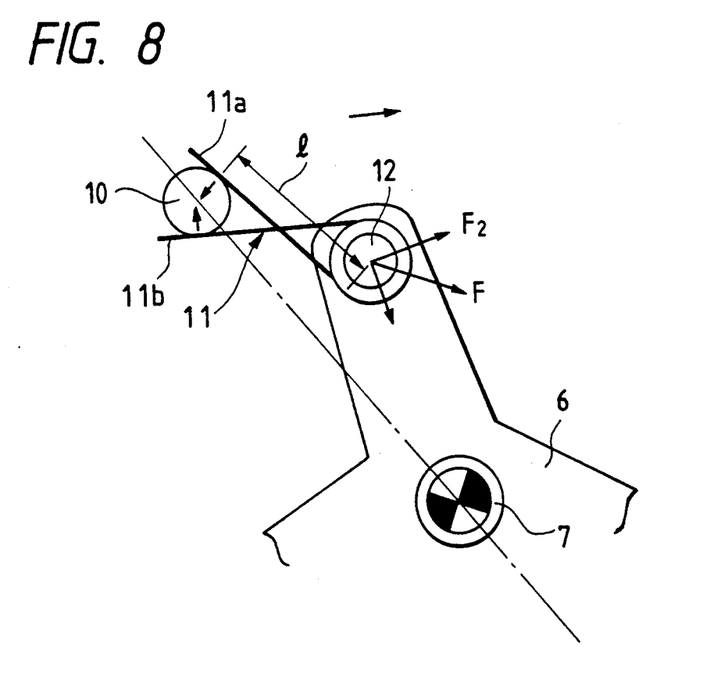
FIG. 8 is a plan view illustrating relationship between the rotation of the shutter blade opening and closing lever and the acting direction of the resilient force of the shutter blade opening spring when the smaller exposure opening is selected.
Figure 9:
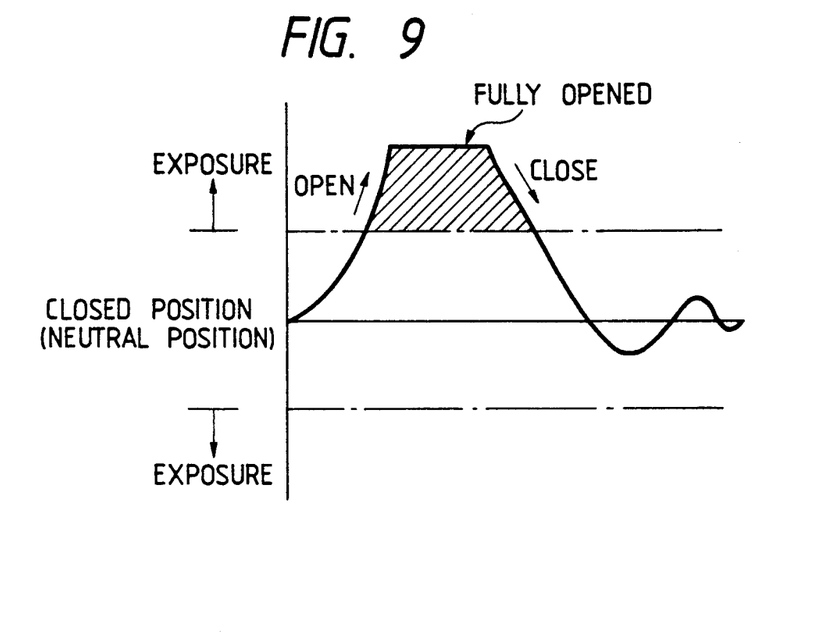
FIG. 9 is a graph illustrating shutter opening characteristic of the camera shutter according to the present invention.

During both of the exposure operations described above, the returning force of the shutter blade closing spring 9, i.e. the closing resilient force $F_1$, varies in conjunction with the opening movements of the shutter blades 2, 4, as illustrated in FIG. 6A. The closing resilient force $F_1$ is minimum when the shutter blades are set at the closed states (FIG. 1) and maximum when the shutter blades are set at the fully opened states (FIG. 2 and FIG. 3). The shutter blade opening spring 11 generates, at the neutral position thereof (FIG. 1), a force F acting in the direction from the pin 6c to the shaft 7 due to the reaction to the resilient forces equal to each other which are exerted by the arms 11a, 11b toward the center of the pole 10, but this force F does not act as a force to turn the shutter blade opening and closing lever 6 because it acts directly towards the axis of the shutter blade opening and closing lever. When the opening and closing lever 6 is turned counterclockwide as shown in FIG. 7, however, said force F produces a component of force $F_2$ which acts to turn said lever 6 counterclockwise. When the opening and closing lever 6 is turned clockwise as shown in FIG. 8, said force F produces a component of force $F_2$ which acts to turn said lever 6 clockwise. This component of force $F_2$ varies as illustrated in FIG. 6B during the opening movements of the shutter blades 2, 4. As a result, the shutter blade opening and closing lever 6 is rotated against a resilient force $(F_1-F_2)$ for opening the shutter blades 2, 4 and turned to the neutral position thereof by the resilient force $(F_1-F_2)$ for closing the shutter blades as shown in FIG. 6c. The shutter blade opening and closing lever 6 has a tendency not stop at the neutral position thereof, but over-runs this position due to the forces of inertia of the shutter blades 2, 4 and the opening and closing lever 6 itself. However, since said resilient force $(F_1-F_2)$ is the maximum at the neutral position, i.e., the shutter blade closed state, as shown in FIG. 6c, the forces of intertia of the shutter blades 2, 4 and the opening and closing lever 6 are remarkably cancelled at the neutral position, thereby suppressing the over-running of the opening and closing lever 6. Thus the opening and closing lever 6 tends to return to the neutral position thereof under the reaction and, also in this course, over-running is suppressed under the action of the resilient force $(F_1-F_2)$. Consequently, the shutter blade opening and closing lever 6 and the shutter blades 2, 4 can be stopped at the neutral positions thereof in a short time without over-running at the final stage of the exposure operation as illustrated in FIG. 9. That is to say, the camera shutter according to the present invention can completely prevent re-exposure due to the over-running of the shutters.

Figure 10:
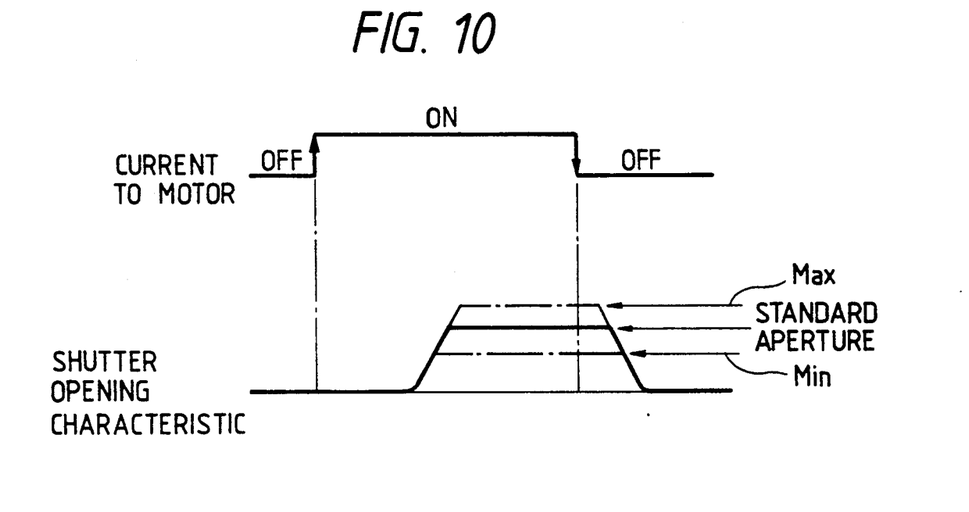
FIG. 10 is a graph illustrating relationship between the time for supplying current to the driving motor and variation of the area of the smaller exposure opening to be adjusted by rotating the stopper.

In addition, when the smaller exposure opening is selected in the first Embodiment described above, the end of the shutter blade 4 contacts at the fully opened position thereof, with the stopper 12 as illustrated in FIG. 3. Accordingly, the shutter blades 2, 4 are stopped at the fully opened positions without fail. As a result, the first Embodiment assures a constant area of the opening which is consistent for stable exposures. Since the location of the stopper to be engaged with the shutter blade 4 is adjustable by turning the stopper 12 with a screwdriver or the similar means, the first Embodiment permits adjusting the area of the opening or exposure between a maximum value Max and a minimum value Min thereof as shown in FIG. 10. Consequenctly, the first Embodiment permits controlling the exposure accurately as predetermined without changing the time for supplying a current to the driving motor even when the larger and smaller exposure openings are switched from one to the other, and simplifying the composition of the motor driving circuit. The stopper 12 may be so constructed as to be engaged with the shutter blade at the fully opened position thereof which corresponds to the larger exposure opening, or the fully opened positions which correspond to both the larger exposure opening and the smaller exposure opening.

Figure 11:
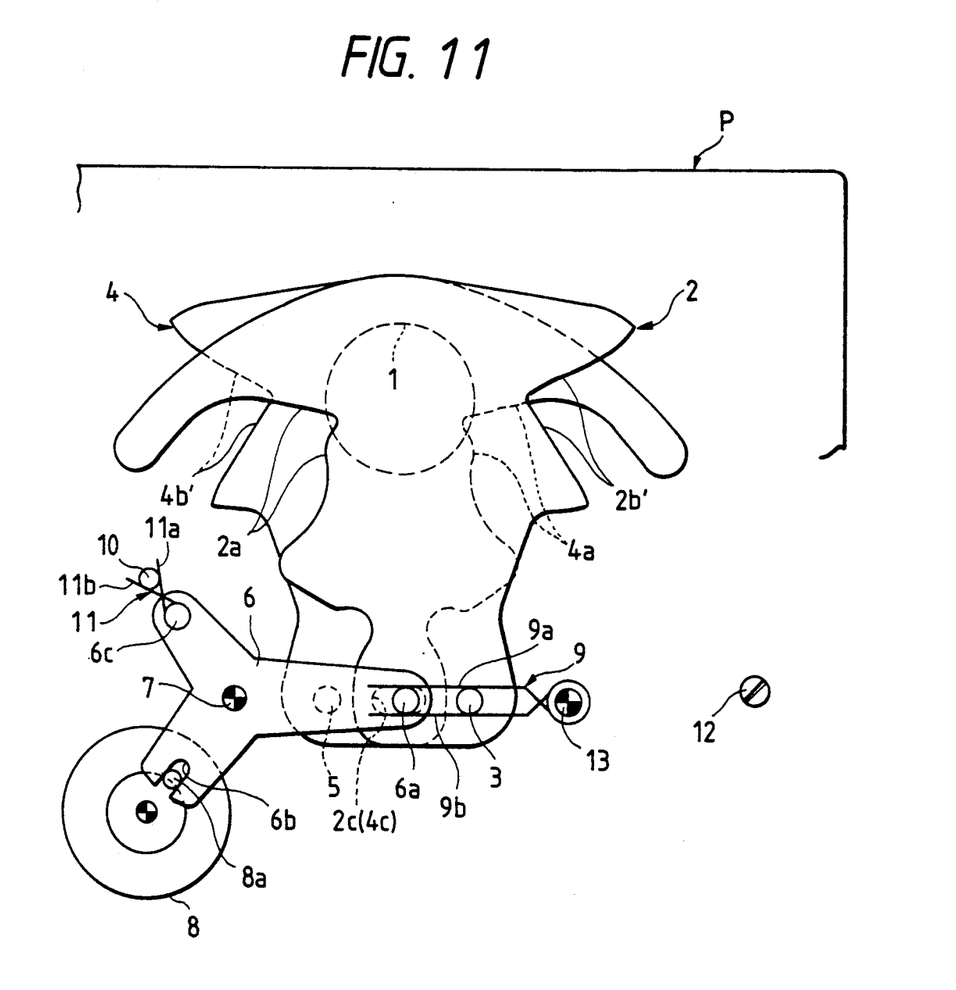
FIG. 11 is a plan view illustrating structures of main parts of a second Embodiment of the camera shutter according to the present invention in a condition where the shutter blades are closed.

FIG. 11 illustrates a second Embodiment of the camera shutter according to the present invention. The second Embodiment is different from the first Embodiment in that the second embodiment has shutter blades which are modified in shape as compared to the shape of the first embodiment, especially in the shape of second opening forming portions 2b', 4b'. The second embodiment is also different regarding the mounting of the shutter blade closing spring 9, which is wound around a pole 13 studded on the shutter base plate P. As shown in FIG. 11, however, the second Embodiment is the same as the first Embodiment in the other constructional points as well as the functions and advantages. Therefore, the members and parts of the second Embodiment which are the same or similar as or to those of the first Embodiment are represented by the same reference numerals in FIG. 11 and will not be described in particular.

Though each of the embodiments described above uses the two shutter blades, it is possible, needless to say, to use three or more shutter blades. Further, though the shutter blade closing spring 9 is set so as to intersect the arms 9a, 9b in the "X" shape with each other in each of the embodiments, these arms 9a, 9b may be stretched parallel with each other so as to sandwich the driving pin 6a. In this case, the arms 9a and 9b tend to be apart from each other toward the ends thereof, but this tendency can be compensated by changing the thickness of the pin to be sandwiched between the arms. Furthermore, it is possible to modify the embodiments so as to permit controlling exposure time at various spans for one exposure operation by stopping the current supply to the driving motor before the shutter blades reach the fully opened positions thereof or changing the time interval for changing polarity.

Moreover, the shutter blade closing spring 9 may be stretched in such a manner that the arms 9a, 9b thereof sandwich the driving pin 8a so as to retain it at the neutral position thereof, thereby retaining the rotor of the driving motor 8 at the neutral position thereof, and the shutter blades 2, 4 may be pivoted by a common shaft on the shutter base plate P and pin-slot connected respectively to the shutter blade opening and closing lever 6. In the latter case, the pin-slot connection may be realized, for example, by forming plastic moldings of the shutter blades incorporating pins and fitting these pins into two slots formed in the shutter blade opening and closing lever 6.

What is claimed is:

1. A camera shutter comprising:

a shutter base plate having an exposure aperture;

a plurality of shutter blades, each pivoted on said shutter base plate, and each shutter blade having a first opening forming portion for forming a first exposure opening on the exposure aperture and a second opening forming portion for forming a second exposure opening, different in size from said first exposure opening, on the exposure aperture;

a shutter blade opening and closing lever pivotally mounted on said shutter base plate, and operatively connected to said plurality of shutter blades for pivoting said plurality of shutter blades to positions for forming the first exposure opening, and to other positions for forming the second exposure opening, and to closed positions thereof;

a closing spring supported on said shutter base plate and having a pair of arms for retaining said plurality of shutter blades at the closed positions thereof and biasing these shutter blades toward the closed positions thereof when said blades are moved toward the opened positions thereof; and a driving motor mounted on said shutter base plate and directly connected to said shutter blade opening and closing lever for driving said shutter blade opening and closing lever, the driving motor being rotatable in two opposite directions by supplying a current in one of two opposite directions; such that:

said plurality of shutter blades are opened by said shutter blade opening and closing lever forming said first exposure opening when said driving motor is rotated in a first direction;

said plurality of shutter blades are opened by said shutter blade opening and closing lever forming said second exposure opening when said driving motor is rotated in a second direction opposite to said first direction; and current supply to said driving motor is stopped upon lapse of a predetermined exposure time, whereby said plurality of shutter blades are returned to the closed positions thereof by said closing spring by way of said shutter blade opening and closing lever.

2. A camera shutter according to claim 1 further comprising an opening spring connected between said shutter base plate and said shutter blade opening and closing lever, said spring exerting no rotating force to said shutter blade opening and closing lever when said plurality of shutter blades are at the closed positions thereof, and exerting a resilient force to said shutter blade opening and closing lever in the rotating direction thereof when said plurality of shutter blades are to be opened, said opening spring having a resilient force being less than a resilient force of said closing spring.

3. A camera shutter according to claim 1 further comprising a stopper mounted on said shutter base plate so as to be eccentrically rotatable and engaged with at least one of said plurality of shutter blades when at least one of said first and second exposure openings is formed, the fully opened positions of said plurality of shutter blades being adjusted by turning said stopper.

4. A camera shutter according to claim 1 wherein said plurality of shutter blades have first opening forming portions of the same shape and second opening forming portions of the same shape.

5. A camera shutter according to claim 1 wherein said closing spring has a pair of arms extending from a base portion thereof wound around a supporting shaft of said shutter blade opening and closing lever for sandwiching a driving pin fixed on said shutter blade opening and closing lever.

6. A camera shutter according to claim 1 wherein said closing spring has a pair of arms extending from a base portion thereof wound around a pole studded on said shutter base plate for sandwiching a driving pin fixed on said shutter blade opening and closing lever.

7. A camera shutter comprising:

a shutter base plate having an exposure aperture;

a plurality of shutter blades, each pivoted on said shutter base plate, and each shutter blade having a first opening forming portion for forming a first exposure opening on the exposure aperture and a second opening forming portion for forming a second exposure opening, different in size from said first exposure opening, on the exposure aperture;

a shutter blade opening and closing lever pivotally mounted on said shutter base plate, and operatively connected to said plurality of shutter blades for pivoting said plurality of shutter blades to positions for forming the first exposure opening, and to other positions for forming the second exposure opening, and to closed positions thereof;

a closing spring supported on said shutter base plate and having a pair of arms for retaining said plurality of shutter blades at the closed positions thereof and biasing these shutter blades toward the closed positions thereof when said blades are moved toward the opened positions thereof; and a driving motor rotatable in two directions mounted on said shutter base plate and directly connected to said shutter blade opening and closing lever for driving said shutter blade opening and closing lever such that when a current is applied to the motor, the shutter blades are moved to form an exposure opening, the blades remain in such a position until the current to the motor is discontinued, such that:

said plurality of shutter blades are opened by said shutter blade opening and closing lever forming said first exposure opening when said driving motor is rotated in a first direction;

said plurality of shutter blades are opened by said shutter blade opening and closing lever forming said second exposure opening when said driving motor is rotated in a second direction opposite to said first direction; and said plurality of shutter blades are returned to the closed positions thereof by said closing spring by way of said shutter blade opening and closing lever when current supply to said driving motor is stopped upon lapse of a predetermined exposure time.

8. A camera shutter according to claim 7 further comprising an opening spring connected between said shutter base plate and said shutter blade opening and closing lever, said spring exerting no rotating force to said shutter blade opening and closing lever when said plurality of shutter blades are at the closed positions thereof, and exerting a resilient force to said shutter blade opening and closing lever in the rotating direction thereof when said plurality of shutter blades are to be opened, said opening spring having a resilient force being less than a resilient force of said closing spring.

9. A camera shutter according to claim 7 further comprising a stopper mounted on said shutter base so as to be eccentrically rotatable and engaged with at least one of said plurality of shutter blades when at least one of said first and second exposure openings is formed, the fully opened positions of said plurality of shutter blades being adjusted by turning said stopper.

10. A camera shutter according to claim 7 wherein each of said plurality of shutter blades have first opening forming portions of the same shape and second opening forming portions of the same shape.

11. A camera shutter according to claim 7 wherein said closing spring has a pair of arms extending from a base portion thereof wound around a supporting shaft of said shutter blade opening and closing lever for sandwiching a driving pin fixed on said shutter blade opening and closing lever.

12. A camera shutter according to claim 7 wherein said closing spring has a pair of arms extending from a base portion thereof wound around a pole studded on said shutter base plate for sandwiching a driving pin fixed on said shutter blade opening and closing lever.

13. A camera shutter comprising:
a shutter base plate having an exposure aperture;
a plurality of shutter blades, each pivoted on said shutter base plate, and each shutter blade having a first opening forming portion for forming a first exposure opening on the exposure aperture and a second opening forming portion for forming a second exposure opening, different in size from said first exposure opening, on the exposure aperture;
a shutter blade opening and closing lever pivotally mounted on said shutter base plate, and operatively connected to said plurality of shutter blades for pivoting said plurality of shutter blades to positions for forming the first exposure opening, and to other positions for forming the second exposure opening, and to closed positions thereof;
a closing spring supported on said shutter base plate and having a pair of arms for retaining said plurality of shutter blades at the closed positions thereof and biasing these shutter blades toward the closed positions thereof when said blades are moved toward the opened positions thereof; and
a driving motor mounted on said shutter base plate and directly connected to said shutter blade opening and closing lever for driving said shutter blade opening and closing lever, such that:
said plurality of shutter blades are opened and maintained opened by said shutter blade opening and closing lever forming said first exposure opening when said driving motor is rotated in a first direction;
said plurality of shutter blades are opened and maintained opened by said shutter blade opening and closing lever forming said second exposure opening when said driving motor is rotated in a second direction reverse to said first direction; and
said plurality of shutter blades are returned to the closed positions thereof by said closing spring by way of said shutter blade opening and closing lever when current supply to said driving motor is stopped upon lapse of a predetermined exposure time.

14. A camera shutter according to claim 13 further comprising an opening spring connected between said shutter base plate and said shutter blade opening and closing lever, said spring exerting no rotating force to said shutter blade opening and closing lever when said plurality of shutter blades are at the closed positions thereof, and exerting a resilient force to said shutter blade opening and closing lever in the rotating direction thereof when said plurality of shutter blades are to be opened, said opening spring having a resilient force being less than the resilient force of said closing spring.

15. A camera shutter according to claim 13 further comprising a stopper mounted on said shutter base so as to be eccentrically rotatable and engaged with at least one of said plurality of shutter blades when at least one of said first and second exposure openings is formed, the fully opened positions of said plurality of shutter blades being adjusted by turning said stopper.

16. A camera shutter according to claim 13 wherein said plurality of shutter blades have first opening forming portions of the same shape and second opening forming portions of the same shape.

17. A camera shutter according to claim 13 wherein said closing spring has a pair of arms extending from a base portion thereof wound around a supporting shaft of said shutter blade opening and closing lever for sandwiching a driving pin fixed on said shutter blade opening and closing lever.

18. A camera shutter according to claim 13 wherein said closing spring has a pair of arms extending from a base portion thereof wound around a pole studded on said shutter base plate for sandwiching a driving pin fixed on said shutter blade opening and closing lever.

* * * * *